United States Patent [19]
Erickson et al.

[11] 3,834,795
[45] Sept. 10, 1974

[54] DIRECT VISION LASER RANGE GATE SYSTEM

[75] Inventors: Allen M. Erickson; Robert L. Kaplow, both of Silver Spring; W. Lawton King, Adelphi, all of Md.

[73] Assignee: The United States of America as represented by the Secretary of the Navy, Washington, D.C.

[22] Filed: May 2, 1973

[21] Appl. No.: 356,556

[52] U.S. Cl............................ 350/161, 356/3, 356/5
[51] Int. Cl............................................... G01c 3/08
[58] Field of Search ................. 350/161; 356/3, 4, 5

[56] References Cited
UNITED STATES PATENTS

| 3,380,358 | 4/1968 | Neumann | 356/5 |
| 3,446,555 | 5/1969 | Kahn | 356/5 |
| 3,546,620 | 12/1970 | Erickson et al. | 336/94.5 Q |
| 3,689,156 | 9/1972 | Kerpchar | 356/5 |

*Primary Examiner*—Vincent P. McGraw
*Attorney, Agent, or Firm*—R. S. Sciascia; J. A. Cooke; F. K. Yee

[57] ABSTRACT

A range gate system to permit direct visual observation through visual obstructions having a laser which illuminates with a series of light pulses and develops a signal to initiate an electrical delay equal to the time required for the pulse to travel to and return from an obscured object. The delay activates a pulse generator to produce an electroacoustic shock wave which opens and closes a Fabry-Perot visual shutter for a period of nanoseconds to permit the object reflection to pass through to the observer's eyes.

5 Claims, 3 Drawing Figures

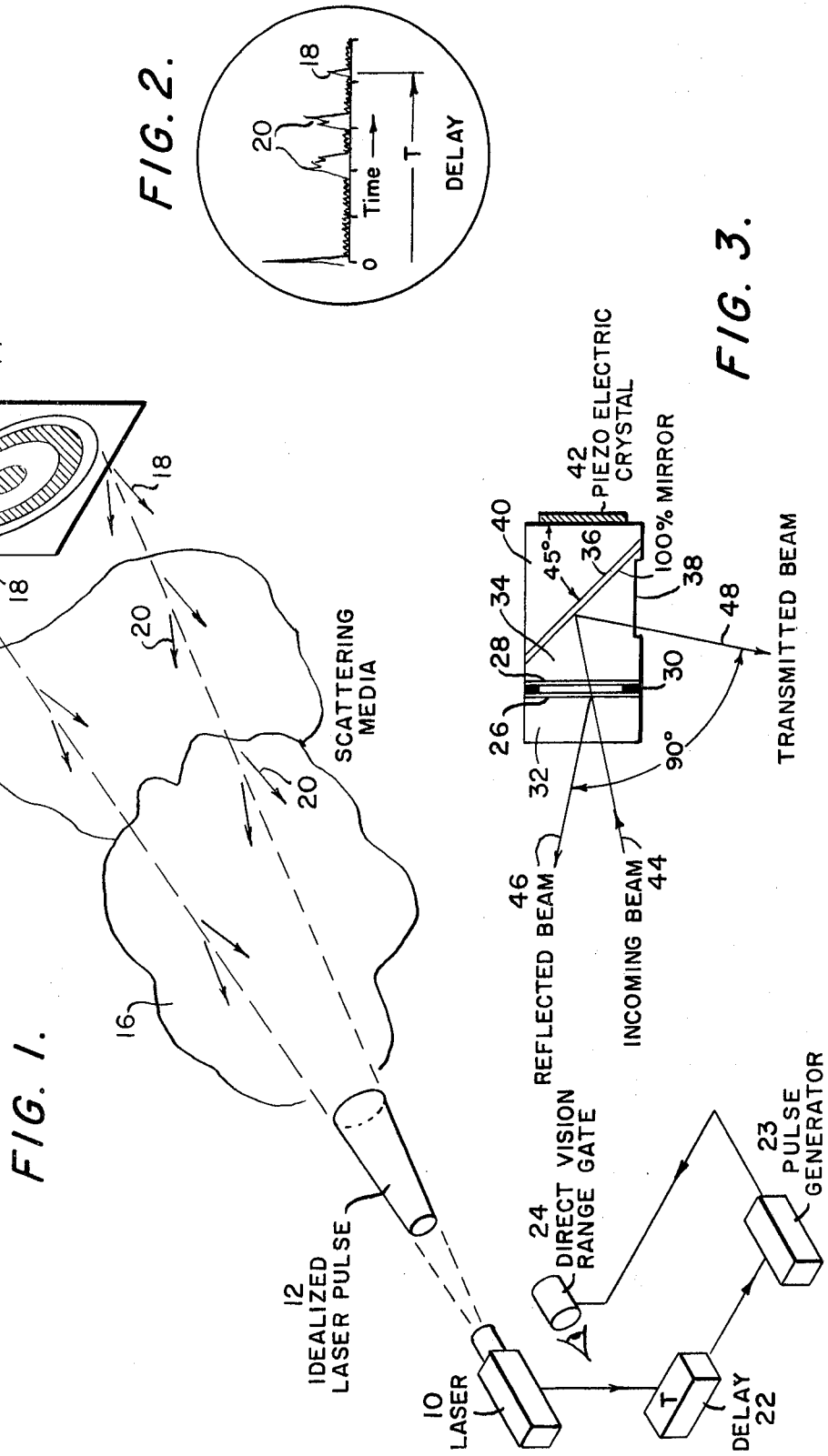

ic delay equal to twice the time necessary for the laser light pulses to travel to the object. The delay is used to generate an electroacoustic shock wave which opens the Fabry-Perot visual shutter for aproximately thirty nanoseconds, permitting the target reflection to pass through to the observer's eye and then closing again. Variation of the electrical delay permits depth scanning of the field of vision.

DIRECT VISION LASER RANGE GATE SYSTEM

BACKGROUND OF THE INVENTION

The present invention relates generally to range gating apparatuses and more particularly to a laser range gating device which permits the direct observation of objects through visual obstructions.

In attempting to observe objects immersed in a medium containing dispersed, diffusing particles, e.g. smoke, fog, or snow in the atmosphere or suspended matter in water, the objects are obscured by a veil resulting from the scattering and reflection of light by these particles.

One method of obtaining unobstructed vision of such objects is through the use of optical range gating. Range gating involves the transmission of very short pulses of light to the object and the regulated activation of the observation means for a very brief interval at the exact time the reflected light pulses from the visual plane of the object arrive at the observation means. Reflected light or backscatter, from the diffusing particles arriving before or after the observation means is activated does not pass through and thus does not degrade object visibility.

Heretofore, most range gating systems involved the use of image converter tubes or similar devices to provide the nanosecond-region gating function, i.e., the very brief opening and closing or shuttering of the observation means to permit viewing of the object reflection only, along with light amplifiers or intensifiers and television systems for monitoring the reflected light pulses and rendering a visible image. These systems suffer from the usual problems associated with complex, high-voltage electronic equipment, e.g., cumbersome bulk and poor signal-to-noise ratio due to electron buildup during the closed cycle which are then accelerated with object image electrons, creating high background noise. In focusing-type light amplifiers, an additional problem exists since the focus is correct at only one value of high voltage; during voltage rise, the tube is out of focus.

SUMMARY OF THE INVENTION

It is therefore an object of the present invention to provide a new and improved visual range gate permitting direct observation of objects in an obscuring medium.

Another object of this invention is to provide a new and improved direct vision range gate that is simple, compact, reliable and always in focus.

Another object of the invention is to provide a new and improved direct vision range gate using a laser object illuminator.

Still another object of this invention is the provision of a new and improved direct vision range gate combining the use of a laser object illuminator with a Fabry-Perot visual shutter.

A further object of the invention is the provision of a laser-gated system which provides gated, direct view using the human eye as a first and last light amplifier, obviating the need for electronic light amplifiers.

Briefly, in accordance with one embodiment of this invention, these and other objects are attained by providing in a range gating system a laser illuminator which emits a train of light pulses in the direction of the obscured object and develops a signal initiating an electrical

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawings herein:

FIG. 1 is a diagrammatic representation of the invention;

FIG. 2 is a time sequence of reflections of the laser pulse; and

FIG. 3 is a schematic representation of the visual gating shutter.

DESCRIPTION OF THE PREFERRED EMBODIMENT

Referring now to the drawings wherein like reference characters designate corresponding parts throughout the several views and more particularly to FIG. 1 thereof, the gating system is shown to include a laser illuminating device 10 which emits a train of idealized laser pulses 12 directed at a target or object 14 obscured by a diffusing or scattering media 16, such as fog in the air or turbid water. Pulses 18 and 20 are reflected by the object 14 and scattering media 16, respectively.

Suitable equipment cooperates with the laser device 10 such that when laser 10 emits a pulse, a signal is generated which is used to start an electrical delay 22 that is equal to the time necessary for the laser light pulse to travel to the object and back. At that instant of return, the signal from delay 22 activates a pulse generator 23 which causes the visual range gate 24 to open for a period of 30 nanoseconds or just long enough for the target reflection 18 to get through to the observer's eye and then closes again. Backscatter reflections 20 and reflections from objects beyond the range of object 14 arrive at the visual gate after it has closed and thus are not seen by the observer. The image of the object 14 is greatly enhanced since the only obscurants are those reflections from the same visual plane as that of object 14.

FIG. 2 represents the sequence of reflections from the laser pulses as a function of time. At time zero, laser 10 emits a pulse 12. Reflected pulse 20 from the scattering media arrives at the visual gate 24 when it is still closed, while reflected pulse 18 from object 14 arrives at the instant delay interval T has elapsed and the visual gate is opened for a period of nanoseconds.

While not shown in FIG. 1, the laser device 10 includes the necessary power source, suitable optics, and suitable Q-switching means which are all known in the art and need not be considered further herein. Similarly the delay means 22 and pulse generator 23 are known to those skilled in the art.

It is evident from the above general description that if the delay is continuously varied, i.e., from a relatively short interval to increasingly longer intervals, the visual gate can be opened to permit observation of objects at different distances from the laser. Such a range scanning feature would improve surveillance and target detection under poor visibility conditions.

The visual shutter 24 which makes possible the direct vision range gate system of FIG. 1 is shown in FIG. 3. Shutter 24 is based upon the scanning Fabry-Perot laser Q-switch described in U.S. Pat. No. 3,546,620 which has been suitably modified for visual gating. Parallel, dielectric mirrors 26 and 28 are properly spaced by the dielectric ring spacer 30 to form the Fabry-Perot cavity. Mirrors 26, 28 are partial reflectors, e.g., from 85 to 98 percent reflective, and are supported by suitable transparent substrate 32 and 34, respectively, such as quartz or glass. In the embodiment of FIG. 3, mirrors 26 and 28 are fabricated by depositing ultra-thin layers of reflective material on the surfaces of substrate 32, 34 with the substrates bonded together, properly separated by spacer 30. The proper spacing of mirrors 26, 28 is dependent upon the wave length characterized by the type of laser light being used as the illuminator, as set forth in the above-mentioned U.S. Pat. No. 3,546,620.

As shown in FIG. 3, a 100 percent reflective mirror 36 is positioned at a 45° angle with respect to the Fabry-Perot cavity 26, 28. Mirror 36 reflects the incoming laser pulse, transmitted through mirror 26, 28, out through an observation window 38 notched into one side of substrate 34. Mirror 36 may be fabricated by coating the aft surface of substrate 34, which has been cut at a 45° angle, with a suitable reflective material. Then an additional substrate 40 of quartz or glass with a forward surface at 45°, is suitably bonded to substrate 34, such as with a transparent adhesive. A piezoelectric crystal 42 is suitably bonded to the aft surface of substrate 40. Acoustically substrates 34 and 40 behave as a single substrate, transmitting the acoustic shock wave from crystal 42 to mirror 28.

The visual shutter 24 of FIG. 3 operates as follows: the incoming light beam on laser pulse 44 is normally reflected as beam 46 by the Fabry-Perot cavity behaving as a totally reflective mirror; however, on command, crystal 42 is energized by an electrical pulse from pulse generator 23, sending an acoustic shock wave through substrates 40, 34 to mirror 28, changing its spacing in relation to mirror 26. A change in spacing of the Fabry-Perot cavity of less than one-fourth wavelength of the laser light is sufficient to change the Fabry-Perot cavity from maximum reflection to maximum transmission. The transmitted beam 48 is reflected by mirror 36 out through window 38 to the observer.

By properly regulating the pulsing rate of laser 10, such as at 30 pulses per second, a continuous image of target 14 may be seen.

Visual shutter 24 may be incorporated into any suitable optical equipment, including those which permit direct viewing with the eye and those adapted for photography. As illustrative examples only, the visual shutter may be readily incorporated into binoculars and telescopes by substituting shutter 24 for an existing prism in these optical devices and thus increase the viewing range of the eye. Additionally, by providing both of the observer's eyes with the visual gate of the present invention, a "sterovision" feature is possible which is not achievable with other range gating systems.

Suitable safety features may be incorporated into the direct vision range gating system and are within the scope of the invention. For example, if it is desired to utilize a laser device with a variable power output to increase target range, suitable sensors may be provided which would prevent visual shutter opening if excessive amounts of laser energy are detected. Similar safety features could be incorporated into any variable delay mechanisms such that for increasingly short delay times, the time the shutter is open is accordingly decreased.

Thus a novel and unique range gating system has been described wherein a laser-illuminated, obscured object may be viewed directly with the human eye by means of a novel Fabry-Perot visual shutter. The eye is the first and last light amplifying means, obviating the requirement for electronic shuttering, photo-imaging devices, light detecting and amplifying means and other equipment associated with existing range gating systems.

Obviously numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A direct vision range gate system comprising:
    a controlled, repetitively-activated laser illumination device for illuminating the observed object;
    a selectively controllable electrical delay synchronization means activated by said laser illumination device to produce control signals;
    a Fabry-Perot visual shutter regulating the transmission of reflected illumination including
        a pair of parallel, closely spaced dielectric mirrors forming a Fabry-Perot cavity normally having a light reflective characteristic,
        separator means positioned between said mirrors to precisely space said mirrors, and
        a totally reflective mirror positioned to reflect incident illumination; and
    activating means coupled with said delay synchronization means to control the opening and closing of said visual shutter.

2. The system of claim 1 wherein said activating means comprise
    a pulse generator controlled by signals from said electrical delay and
    electroacoustic means positioned in said visual shutter and coupled to said pulse generator.

3. The system of claim 2 wherein said totally reflective mirror is positioned at an angle of 45° with respect to said dielectric mirrors.

4. The system of claim 3 wherein said visual shutter further comprises a viewing window positioned at 45° relative to said totally reflective mirror such that light reflected by said mirror is transmitted through said window.

5. The system of claim 4 wherein said electroacoustic means comprises a piezoelectric crystal positioned parallel to the mirrors of the Fabry-Perot cavity such that when said crystal is energized by said pulse generator, an acoustic shock wave alters the spacing of one of said Fabry-Perot cavity mirrors causing said mirrors to assume a light-transmissive characteristic.

* * * * *